Figure 1:

April 28, 1936. C. F. BRODIN 2,038,712

APPARATUS FOR PRESSING AND DEHYDRATING FIBROUS MATERIALS

Filed Nov. 18, 1933

Inventor:
Carl F. Brodin,
by Hervey, Barber & McKee,
Attorneys.

Patented Apr. 28, 1936

2,038,712

UNITED STATES PATENT OFFICE 2,038,712

APPARATUS FOR PRESSING AND DEHYDRATING FIBROUS MATERIALS

Carl Fridolf Brodin, Stockholm, Sweden

Application November 18, 1933, Serial No. 698,732
In Sweden December 28, 1932

4 Claims. (Cl. 92—49)

The present invention relates to a process and apparatus for pressing and dehydrating fibrous materials and more particularly for dehydrating the material treated in the manufacture of plates, webs or sheets of cellulose or other fibrous material, especially paper, pasteboard, carton and the like. According to the invention the material to be treated which is hereinafter generically referred to as sheets of fibrous material is subjected to a combined pressing and suction effect, by means of a porous layer consisting entirely or partly of rubber sponge, whereby the liquid in the material treated is allowed to pass through it more or less completely or is absorbed by the said layer. Suitable supporting layers or intermediate layers may be used with the porous layer of rubber sponge.

For pressing between rolls the material is led as a continuous strip between pressing rolls, while the rubber sponge layer serves as a support.

The surface of the rubber sponge layer which faces the material may if desired be covered with a layer of another material for instance, a coating, or a felt of textile material, rattan, or like material.

In order to make the rubber sponge layer more resistant, it may be reenforced or armoured with wires of metal or textile material.

The invention may be advantageously embodied as a machine in the making of paper and pasteboard, in which cases the parts of the machine that are meant for the dehydration and drying of the web of the material, the endless screens, and also the press- and drying felts, may consist of webs or layers of rubber sponge or be coated therewith. In such a case it is suitable, to provide the rubber sponge web, preferably the underside thereof, with an armouring consisting of a network of metal wires, for instance of stainless steel, in order to impart a sufficient solidity to the web or to make it stronger and more durable. The armouring or reenforcing network may also consist of vegetable or mineral fiber material such as hemp, jute, flax, cotton, asbestos, et cetera. It may be undesirable to have the web of rubber sponge come in direct contact with the mass in which case the surface of the rubber sponge web may be provided with a layer of textile material or a woven layer of such a material for example cotton, wool, hemp, jute, flax, agave, asbestos, et cetera. This layer may be applied on both sides of the rubber sponge web or only on one side thereof. A sheet prepared as described will work in a similar way to the felts in paper making machines or presses in the devices known hitherto but acts in an efficient manner to extract the liquid contained in the sheets of fibrous material. Furthermore the risk of the pores of the rubber sponge web being choked by the fibers is avoided by the use of an intermediate layer.

By using specially prepared or arranged material for the layer in contact with the web of fibrous material, suitable designs may be embossed thereon.

The present invention is particularly useful in the pressing and drying devices of pasteboard and paper making machines when it is embodied in a process involving the use of an endless sheet. This endless sheet may be prepared in any of the ways described above and comprises a rubber sponge sheet, armoured or strengthened with a textile or wire fabric on one side or embedded in the rubber sponge where support of this sort is necessary or desired and supplied on the surface in contact with the fibrous sheet material to be treated with a suitable surfacing material. The sponge rubber sheet when in the form of an endless belt may be used to support the wet fibrous material over an extended path in the fashion of screens or felts of the prior art and may carry the wet fibrous material through the pressing and drying rolls. As the two sheets of material are passed through pressing rolls the fluid is forced out of the wet fibrous material and rapidly absorbed by the rubber sponge sheet which, in passing through the rolls, has been pressed and the air removed from the cells thereof. After leaving the rolls, the rubber sponge expands and tends to draw into it any available fluid which, in this case, is the water or other fluid removed from the wet fibrous material. The rubber sponge sheet then continues to carry the dehydrated fibrous material to a subsequent step in the process.

Instead of maintaining the rubber sponge sheet in extended contact with the sheeted fibrous material, it may simply be brought into contact with it near or at the point when both sheets are passed through the pressing rolls. If necessary, the wet fibrous material may be otherwise supported. After leaving the pressing rolls, the rubber sponge sheet is separated from the dehydrated fibrous sheet and submitted to operations which would remove the absorbed liquid from the pores of the sponge rubber and other materials comprising this sheet, after which it is again returned into contact with sheeted wet fibrous material and carried through the pressing rolls.

Pressing rolls, suction rolls and drying cylinders may also be covered with such a layer of rubber sponge, the surface of which is covered with a coating of vegetable or mineral fiber material.

Of course, the cloth mentioned may also be used as a so-called top cloth or top felt, as in pasteboard- or paper making machines, the material or the web of material being, during the treatment, moved on the cloth or covered by the cloth or the layer according to the invention, or lying between two such cloths or layers.

Figure 2:
Figure 3:
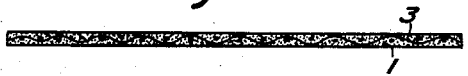

The invention is illustrated by way of example in the accompanying drawing in which Figs. 1, 2 and 3 show diagrammatically in cross section part of different materials according to the invention.

Figure 4:
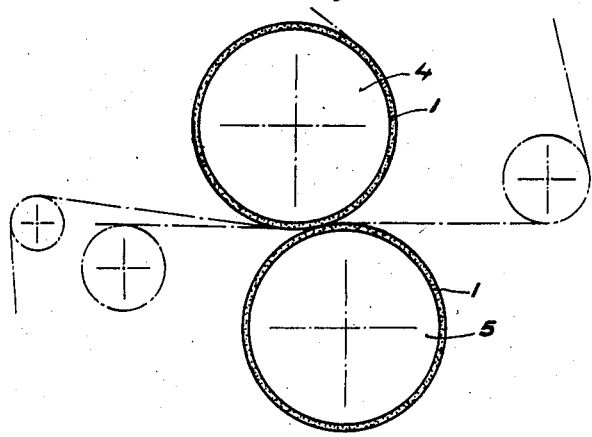

Fig. 4 shows diagrammatically the material when applied on two pressing rolls.

In Fig. 1 numeral 1 indicates the rubber sponge layer and 2 is a layer of textile material disposed on the surface of same.

In Fig. 2 the rubber sponge layer 1 is provided with a layer 2 of textile material on its surface and on the other surface there is provided an armouring net work 3 of metal.

Fig. 3 shows a material where the armouring net work 3 is vulcanized into the rubber sponge layer 1.

In Fig. 4 two pressing rolls 4, 5 are shown in a high pressure press of a paper making machine, the pressing rolls being provided on their surfaces with a layer of rubber sponge 1.

Having now described my invention, what I claim as new and desire to secure by Letters Patent is:

1. A material for dehydrating wet sheeted fibrous material comprising an endless sheet of rubber sponge at least one side of which is covered with a reinforcing material.

2. A material for dehydrating wet sheeted fibrous material comprising an endless sheet of rubber sponge reenforced with threads or filaments in the form of a network.

3. A material for dehydrating wet sheeted fibrous material comprising an endless sheet of flexibly reinforced rubber sponge to support the wet fibrous material at least while in contact with pressing rolls.

4. A material for dehydrating wet sheeted fibrous material comprising an endless sheet of rubber sponge including a reenforcing sheet on one side and a porous felt on the other, said endless sheet serving to support the wet fibrous material at least while in contact with pressing rolls.

CARL FRIDOLF BRODIN.